(12) United States Patent
Lindoff et al.

(10) Patent No.: US 8,401,128 B2
(45) Date of Patent: Mar. 19, 2013

(54) METHOD AND SYSTEM FOR ADAPTABLE RECEIVER PARAMETERS

(75) Inventors: Bengt Lindoff, Bjärred (SE); Bo Bernhardsson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2728 days.

(21) Appl. No.: 10/830,387

(22) Filed: Apr. 22, 2004

(65) Prior Publication Data

US 2005/0047534 A1 Mar. 3, 2005

Related U.S. Application Data

(60) Provisional application No. 60/498,307, filed on Aug. 28, 2003.

(51) Int. Cl.
*H04L 27/08* (2006.01)
*H04B 3/46* (2006.01)

(52) U.S. Cl. .................................. 375/345; 375/316

(58) Field of Classification Search .............. 375/345, 375/316, 340; 455/450, 552.1
See application file for complete search history.

(56) References Cited

U.S. PATENT DOCUMENTS

| | | | |
|---|---|---|---|
| 5,339,454 A | 8/1994 | Kuo et al. | |
| 5,960,040 A * | 9/1999 | Cai et al. ........................ | 375/279 |
| 6,047,171 A * | 4/2000 | Khayrallah et al. .......... | 455/266 |
| 6,178,211 B1 | 1/2001 | Whikehart et al. | |
| 6,256,358 B1 | 7/2001 | Whikehart et al. | |
| 6,374,116 B1 | 4/2002 | Peterzell et al. | |
| 6,563,891 B1 * | 5/2003 | Eriksson et al. .............. | 375/345 |
| 6,580,920 B2 | 6/2003 | Kalliojärvi | |
| 6,587,514 B1 | 7/2003 | Wright et al. | |
| 6,901,243 B2 * | 5/2005 | Jayaraman et al. .......... | 455/63.1 |
| 6,954,628 B2 * | 10/2005 | Minnis et al. ................. | 455/324 |
| 6,990,357 B2 * | 1/2006 | Ella et al. .................... | 455/553.1 |
| 2002/0123319 A1 | 9/2002 | Peterzell | |
| 2002/0132597 A1 * | 9/2002 | Peterzell et al. .............. | 455/130 |
| 2002/0168037 A1 | 11/2002 | Chen | |
| 2003/0078007 A1 * | 4/2003 | Parssinen et al. ............ | 455/67.1 |
| 2003/0086398 A1 | 5/2003 | Hiltunen | |
| 2003/0087622 A1 | 5/2003 | Jayaraman et al. | |
| 2004/0142670 A1 * | 7/2004 | Ciccarelli .................... | 455/214 |
| 2004/0185807 A1 * | 9/2004 | Ramachandran ........... | 455/127.1 |

FOREIGN PATENT DOCUMENTS

| | | |
|---|---|---|
| GB | 2344494 A | 6/2000 |
| KR | 2000-69922 | 11/2000 |
| KR | 2003 052 195 A | 6/2003 |
| WO | 9925075 A2 | 5/1999 |
| WO | WO 00/72454 A1 | 11/2000 |

(Continued)

OTHER PUBLICATIONS

"Trading System Performance for Energy Use in a VLSI Implementation of an Adaptive Equalizer", Columbia University, New York, Proc 43rd IEEE Midwest Sympos, Aug. 8-11, 2000.*

(Continued)

*Primary Examiner* — Aristocratis Fotakis
(74) *Attorney, Agent, or Firm* — Potomac Patent Group PLLC

(57) ABSTRACT

A method and system are described for processing a received signal at a receiver in a communication system. The receiver includes a digital filter and automatic gain control means. Information indicating the frequency band of operation and the type of service of the received signal is received at the receiver from the communication system. The gain and filtering parameters of the receiver are set according to the received information. The received signal is processed at the receiver using the gain and filtering parameters. Optionally, a determination of whether the received signal contains adjacent channel interference above a predetermined allowable threshold may also be made and the determination may then be used in setting the gain and filtering parameters.

21 Claims, 5 Drawing Sheets

FOREIGN PATENT DOCUMENTS

WO     WO 02/054625 A2     7/2002

OTHER PUBLICATIONS

Peter Okrah, Michael Newhouse, Gary Stuck, "Practical Design Considerations for W-CDMA Systems", Commsdesign website, CSD—May 1999.*

Aarno Pärssinen, Jarkko Jussila, Jussi Ryynanen, Lauri Sumanen, and Kari A. I. Halonen, "A 2-GHz Wide-Band Direct Conversion Receiver for WCDMA Applications", IEEE Journal of Solid-State Circuits, Vol. 34, No. 12, Dec. 1999.*

Lauri Koskinen, Marko Kosunen, Saska Lindfors, Kari Halonen, Low-power Decimation and Channel Selection Filter for a WCDMA Receiver, Electronic Circuit Design Laboratory, Helsinki University of Technology, Proceedings of the 2000 IEEE International Symposium on Intelligent Signal Processing and Communications Systems (ISPACS 2000) Honolulu, Hawaii.*

English language Translation of Korean Office Action, dated Sep. 15, 2010, in connection with counterpart Korean Patent Application No. 2006-7004246.

Korean Office Action, dated Sep. 15, 2010, in connection with counterpart Korean Patent Application No. 2006-7004246.

Müller, F. et al., "Further evolution of the GSM/EDGE radio access network", *Ericsson Review* vol. 78, No. 3, pp. 116-123 (2001).

Hedberg, T. and Parkvall, S., "Evolving WCDMA", *Ericsson Review* vol. 77, No. 2, pp. 124-131 (2001).

Proakis, J.G. and Manolakis, D.G., "Digital Signal Processing, Principles, Algorithms, and Applications", Macmillan, second edition, 2004.

PCT International Search Report, dated Oct. 25, 2004, in connection with International Application No. PCT/EP2004/009197.

PCT Written Opinion, dated Oct. 25, 2004, in connection with International Application No. PCT/EP2004/009197.

* cited by examiner

METHOD AND SYSTEM FOR ADAPTABLE RECEIVER PARAMETERS

RELATED APPLICATIONS

This application is related to, and claims priority from, U.S. Provisional Application Ser. No. 60/498,307 entitled "A Flexible Receiver Architecture" filed on Aug. 28, 2003, the disclosure of which is expressly incorporated herein by reference.

BACKGROUND

The invention relates to communications systems, more particularly to adapting receiver signal processing parameters based on the current service and frequency band used.

The cellular telephone industry has made phenomenal strides in commercial operations throughout the world. One important step in the advancement of radio communication systems has been the change from analog to digital transmission. Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and WCDMA telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for simplicity, but it will be understood that the principles described in this application can be implemented in other digital communication systems.

Equally significant is the choice of an effective digital transmission scheme for implementing next generation technology. Personal Communication Networks (PCNs), employing low cost, pocket-sized, cordless telephones that can be carried comfortably and used to make or receive calls in the home, office, street, car, and the like, are being provided by, for example, cellular carriers using the digital cellular system infrastructure. An important feature desired in these new systems is increased traffic capacity, and efficient use of this capacity. It is also important for the portable devices in such systems to provide high quality service while conserving energy to whatever extent possible, since they are very often powered by batteries.

Recent efforts at providing such systems have focused on the use of WCDMA techniques. In a WCDMA system, multiple users utilize the same radio spectrum simultaneously. From the point of view of a receiver in a WCDMA system, a received signal comprises a desired signal (i.e., a signal intended to be received by that particular receiver) and a high level of noise. To enable the receiver to extract the desired signal from the received signal, information intended for that receiver is "spread" by combining (e.g., by multiplying) the information with a much higher bit rate known signature sequence. The signature sequence is unique to this particular receiver. One way to generate the signature sequence is with a pseudo-noise (PN) process that appears random, but can be replicated by an authorized user.

Because each active transmitter is utilizing the same process, a plurality of spread information signals modulate a radio frequency carrier, for example by binary phase shift keying (BPSK), and as said before, are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation is used, then the signature sequence may consist of complex numbers (having real and imaginary parts), where the real and imaginary parts are used to modulate respective ones of two carriers at the same frequency, but ninety degrees out of phase with respect to one another.

Traditionally, a signature sequence is used to represent one bit of information. Receiving the transmitted sequence or its complement indicates whether the information bit is a +1 or −1, sometimes denoted "0" or "1". The signature sequence usually comprises some number, N, bits, and each bit of the signature sequence is called a "chip". The entire N-chip sequence, or its complement, is referred to as a transmitted symbol. The conventional receiver, such as a RAKE receiver, correlates the received signal with the complex conjugate of the known signature sequence to produce a correlation value. Only the real part of the correlation value is computed. When a large positive correlation results, a "0" is detected; when a large negative correlation results, a "1" is detected.

A number of efforts to standardize the use of WCDMA techniques in mobile communication systems exist. One such effort is being accomplished by the 3GPP. The term "third generation" refers to the fact that so-called second-generation radio access technology brought mobile telephony to a broad market. By contrast, third-generation radio access technology extends beyond basic telephony: a common, Internet Protocol (IP)-based service platform will offer mobile users an abundance of real-time and non-real time (traditional data) services.

Typical services with real-time requirements are voice and video, as well as delay-sensitive applications, such as traffic-signaling systems, remote sensing, and systems that provide interactive access to World Wide Web (WWW) servers. As explained in, for example, F. Müller et al., "Further evolution of the GSM/EDGE radio access network", Ericsson Review vol. 78, no. 3, pp. 116-123 (2001), the challenge is to implement end-to-end services based on the Internet Protocol (IP). The main benefit of running IP end-to-end—including over the air interface—is service flexibility. Indeed, flexibility more or less eliminates dependencies between applications and underlying networks, for example, access networks. To date, cellular access networks have been optimized in terms of voice quality and spectrum efficiency for circuit-switched voice applications. However, for services such as IP multimedia, which includes voice, the main challenge is to retain comparable quality and spectrum efficiency without decreasing service flexibility. Today, for example, we can suffer considerable protocol overhead when we bridge the air interface with real-time protocol (RTP), user datagram protocol (UDP) or IP packets (which carry media frames). Needless to say, this runs counter to the goal of spectrum efficiency. To achieve spectrum efficiency, we can instead characterize different packet data streams in terms of bandwidth and delay requirements. Characterization of this kind is useful when implementing admission access algorithms that accommodate multiple user data streams in available spectrum. Different methods of limiting data (such as header compression and session signaling compression) must also be applied to obtain adequate spectrum efficiency.

T. Hedberg and S. Parkvall, "Evolving WCDMA", *Ericsson Review* vol. 77, no. 2 pp. 124-131 (2001) describes how, for the purpose of improving support for best-effort packet data, the 3GPP is working on an evolution of WCDMA known as high speed downlink packet data access (HSDPA). This enhancement to prior systems increases capacity, reduces round-trip delay, and increases peak data rates up to 8-10 Mbit/s. To achieve these goals, a new shared downlink shared channel (HS-DSCH) has been introduced. In addition, three fundamental technologies, which are tightly coupled and rely on the rapid adaptation of the transmission parameters to the instantaneous radio conditions, have been introduced with this channel: fast-link adaptation technology enables the use of spectral-efficient higher-order modulation when channel conditions permit (for example, during a fading peak), and reverts to robust QPSK modulation during less favorable channel conditions (for example, when experiencing a fading dip); fast hybrid automatic-repeat-request (ARQ) technology rapidly requests the retransmission of missing data entities and combines the soft information from the original transmission and any subsequent retransmissions before any attempts are made to decode a message; and fast scheduling of users sharing the HS-DSCH—this technique, which exploits multi-user diversity, strives to transmit to users with favorable radio conditions.

The general arrangement of a conventional receiver is illustrated by FIG. 1. Such a receiver may be used in user equipment (UE), such as a mobile terminal, personal digital assistant (PDA), and the like, communicating in a communication system. An antenna 110 provides a signal to a receiver front end 120, which down-converts the signal to lower frequencies that are more conveniently handled by the receiver. The down-converted signal is appropriately shaped by a filter 130 and variable amplifier 140, which typically has an adjustable gain. The gain of the variable amplifier 140 is automatically controlled by an automatic gain controller (AGC) 170 based on feedback of a portion of the amplified down-converted signal. The amplified down-converted signal is then typically provided to an analog to digital converter (ADC) 150 and additional processing components 160. The AGC 170 adjusts the variable amplifier's 140 gain to maintain the signal at a level that is within a usable range, i.e., dynamic range, of the receiver for further processing. The filter 130 structure and parameters are set to allow the extraction of the signal under the worst case scenario in terms of interference from other signals. For example, a significant limitation in high data rate communication systems is inter-symbol interference (ISI).

The dynamic range in different parts of the receiver is important due to requirements related to power consumption of the receiver. Since UE's are typically portable terminals that are battery powered, it is desirable to minimize power consumption of the receiver. It is well known in the art that by limiting the dynamic range of a received signal within the receiver, power conservation may be realized. For example, the dynamic range of a radio signal input to an ADC should be as limited as possible to enable the use of low resolution, low power ADCs in the receiver. Furthermore, power consumption in analog amplifiers and filter sections is directly proportional to the dynamic range of the input signal.

In conventional receiver architectures used in cellular communication systems (e.g., WCDMA), the digital filtering structure as well as the receiver gain parameters are fixed regardless of the type of service and/or frequency band used. That is, the various parameters that define the filtering and receiver gain applied to the received signal are based on worst case scenarios over all services and frequency bands for a given cellular communication system. Here, the term "services" includes speech service, HSDPA service, video services, and the like. Accordingly, for some combinations of services and frequency bands, the receiver current consumption is unnecessarily high given the received signal. Similarly, the receiver performance tends to be unnecessarily low in certain situations due to this worst-case design.

To illustrate this point, consider that the WCDMA standard will soon utilize frequency bands used by other cellular systems. For example, WCDMA will be deployed in the United States using a frequency in the 1900 MHz band (WCDMA 1900). On this band, however, GSM, and perhaps other cellular systems, may also be operating. The use of two or more systems operating within the same frequency band will present additional interference scenarios, above those expected in a standard WCDMA-only frequency band scenario. The presence of the additional interference will place more stringent requirements on the receiver chain, in terms of filtering and AGC parameters. The adjacent channel requirement for WCDMA 1900 requires sharp filtering, which introduces interchip interference (ICI). Such added interference impacts the performance of HSDPA service. In order to achieve the highest data rates provided in HSDPA, the receiver parameters will have to be optimized for such service. That is, the filtering requirements, sampling accuracy, gain parameters, and the like, should be optimized to prevent the WCDMA 1900 adjacent channel requirements from severely degrading HSDPA peak performance.

To employ a fixed receiver design that is optimized only for the worst case scenario over all frequency bands and services would produce unnecessarily high current consumption and/or reduce HSDPA performance in scenarios where better peak rates could be achieved. What is therefore needed is a method and receiver for adapting receiver signal processing parameters based on the current service and frequency band used to optimize the receiver performance and minimize current consumption.

SUMMARY

Applicants describe a method and receiver that adapt receiver signal processing parameters, including digital filter coefficients and structures, as well as AGC parameters, based on the current service and frequency band used. By adapting these parameters, a better trade-off between receiver performance and current consumption is achieved.

In one aspect, a method is disclosed for processing a received signal at a receiver in a communication system, where the receiver includes a digital filter and automatic gain control means. Information indicating the frequency band of operation and the type of service of the received signal is received at the receiver from the communication system. The gain and filtering parameters of the receiver are set according to the received information. The received signal is processed at the receiver using the gain and filtering parameters.

Optionally, a determination of whether the received signal contains adjacent channel interference above a predetermined allowable threshold may also be made and the determination may then be used in addition to the information indicating the frequency band of operation and the type of service for setting the gain and filtering parameters.

In another aspect, a receiver for processing a received signal in a communication system is disclosed. The receiver includes a digital filter and automatic gain control means. The receiver also includes logic that receives information indicating the frequency band of operation and the type of service of the received signal from the communication system and logic that sets gain and filtering parameters of the receiver according to the received information. Additional logic in the receiver processes the received signal at the receiver using the set gain and filtering parameters.

In yet another aspect, a control unit is disclosed for controlling a receiver in processing a received signal in a communication system, where the receiver includes a digital filter and automatic gain control means. The control unit includes logic that receives information indicating the frequency band of operation and the type of service of the received signal from the communication system and logic that controls the automatic gain control means and filtering parameters of the digital filter receiver according to the received information to process the received signal at the receiver.

BRIEF DESCRIPTION OF THE DRAWINGS

Objects and advantages of the present invention will become apparent to those skilled in the art upon reading this description in conjunction with the accompanying drawings.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer based system, processor containing system, or other system that can fetch the instructions from a medium and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

According to an aspect of the invention, a receiver adapts filter structures and parameters, as well as AGC parameter settings based on the present service and frequency band. For example, when HSDPA service is presently active in a WCDMA 1900 MHz frequency band, the receiver selects various corresponding parameters. The receiver determines the service and frequency band from signaling information available in the network, typically on layers 1-3 of the OSI model. The availability of this signaling information is known in the art and can be found, for example, in the 3GPP specification, in particular in the TS25 series of the specification.

Figure 1:
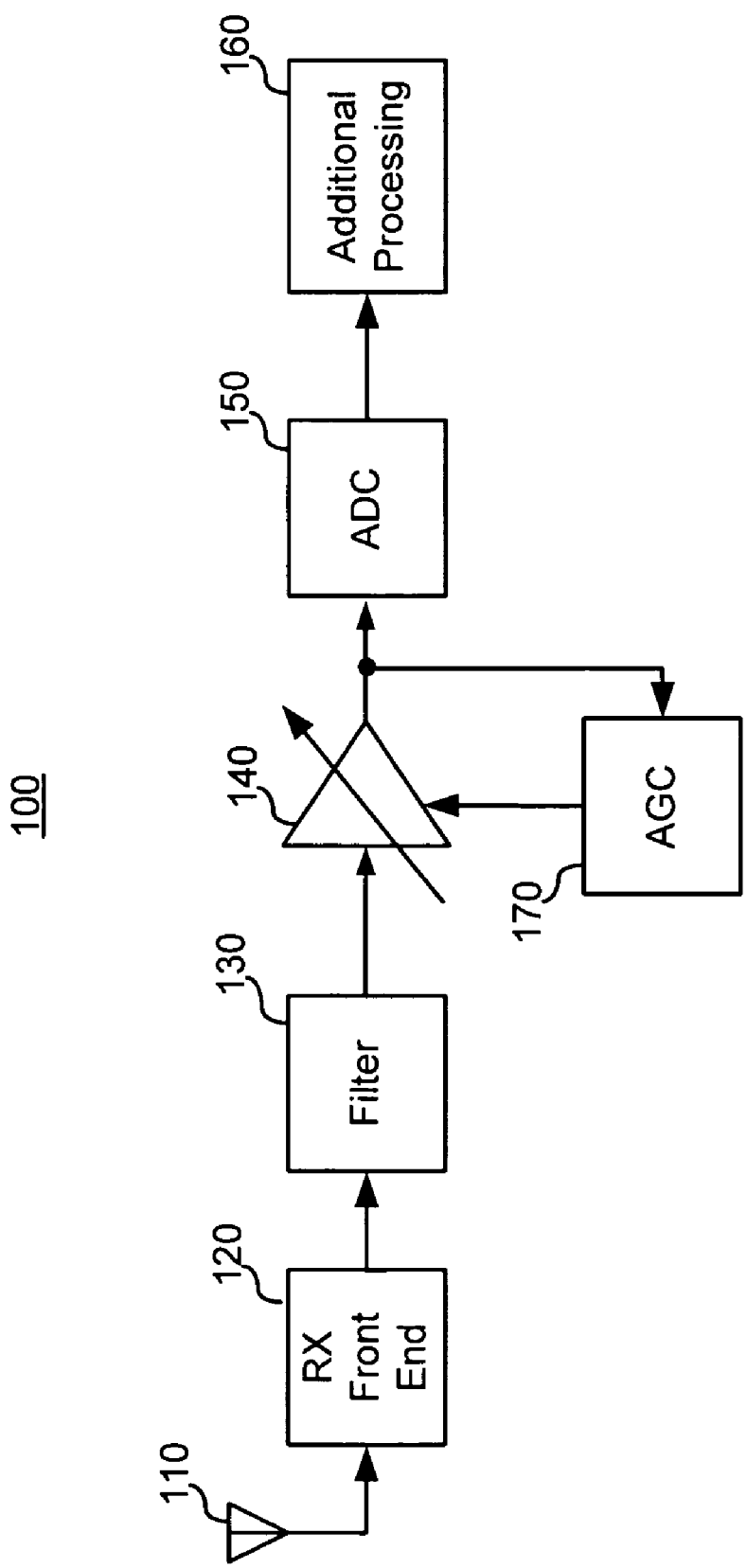
FIG. 1 is a block diagram illustrating a conventional receiver.
Figure 2:
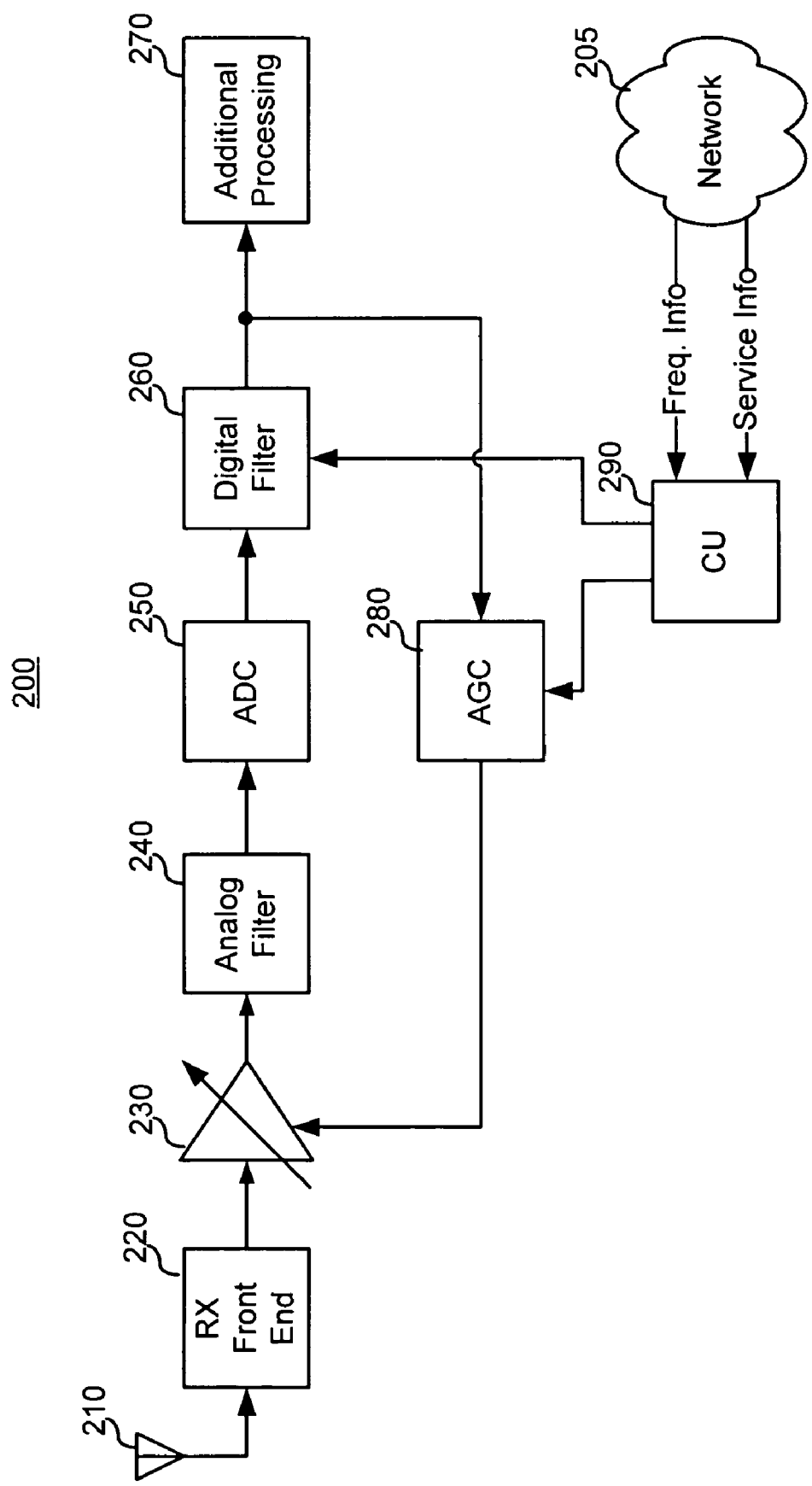
FIG. 2 is a block diagram illustrating a receiver according to an aspect of the invention.

FIG. 2 is a block diagram illustrating a receiver 200 according to an aspect of the invention. The receiver 200 is typically part of a UE, although the receiver can be employed as part of any communication device. Once a connection to a communication system network 205 is established, the receiver 200 receives the necessary information to set up a service connection, such as packet data service over HSDPA, speech, video, and the like, on a specific carrier frequency. Initially, default digital filter and AGC parameters are used. The default parameters are selected to achieve sufficient performance for connection setup. The current service and frequency band information is then provided to a control unit (CU) 290, which processes the information and determines corresponding receiver parameters, such as digital filter structure settings, filter coefficient settings, and AGC parameter settings to increase receiver performance while minimizing current consumption. Digital filter structure settings include, for example, finite impulse response (FIR) and Infinite Impulse Response (IIR). Filter coefficient settings include coefficients for FIR and IIR filters. Various possible coefficient settings may be found in textbooks on digital signal processing, e.g., J. G. Proakis and D. G. Manolakis "Digital Signal Processing, Principles, Algorithms, and Applications", Macmillan, second edition. AGC parameter settings include a reference level for the signal such that the amplification gain is adjusted so the amplified signal corresponds to the reference level and time constants in the AGC loop. The parameters are preferably predetermined and stored in a look-up table (not shown) associated with the CU 290. That is, the parameters are preferably predetermined to provide the best trade-off between receiver requirements and peak performance for each corresponding service and frequency band scenario. Alternatively, the parameters can be calculated on-the-fly using a parameter calculating means (not shown).

When a signal is received at the receiver front end 220 via antenna 210. The receiver front end 220 down-converts the signal to lower frequencies that are more conveniently handled by the receiver 200. Variable amplifier 230 amplifies the signal with an adjustable gain controlled by the AGC 280. The signal is appropriately shaped by an analog filter 240 and converted to a corresponding digital signal in ADC 250. The digital signal receives additional filtering in a digital filter 260 to more accurately extract the information in the originally transmitted signal. The filtered digital signal is then provided to other components for additional processing 270 by the receiver 200 and to the AGC 280 for determining a gain to be used in variable amplifier 230. As discussed above, the digital filter 260 structure and coefficient settings, as well as the AGC 280 parameter settings are set by the CU 290 according to the service and frequency band used to increase receiver performance while minimizing current consumption.

In order to better understand how the parameters are established for specific scenarios, four different scenarios with corresponding parameter settings will be described. In the first example, the receiver 200 is operating on WCDMA band 1 (2110-2170 MHz) and the current service is a WCDMA speech service, which has a bit rate of 12.2 kb/s. Speech service is generally quite robust, and therefore less susceptible to distortions. In addition, cellular communication systems are designed to provide speech service with enough transmit power to comfortably reach the outer boundaries of a cell. As such, other WCDMA communication system operators may also be transmitting within range of the receiver 200 using adjacent carrier frequencies that interfere with the received signals. Therefore, the receiver parameter settings for speech service need to configure the receiver 200 to overcome strong adjacent channel interferers. That is, since receivers operating on WCDMA band 1 primarily need only address WCDMA interferers on adjacent channels, a simple digital filter 260 configuration can be used. For example, the digital filter 260 can be configured with a limited number of taps, such as 10 taps, since the analog filter 240 removes most of the adjacent channel signal. Consequently, the digital filtering process is less current-consuming and introduces less ICI. The receiver 200 can therefore handle stronger adjacent channels for a given quality of service in this configuration. In addition, since we know that there are no strong narrow-band interferers, like those from a GSM system, in the adjacent frequency band (unlike the WCDMA band 2 scenario discussed below), the AGC parameters, such as the reference level, is set to a value that focuses the dynamic range of the ADC 250 on the frequency band. That is, the AGC parameters are selected so the ADC dynamics can be used optimally for representing the desired signal while reducing quantization noise effect, which minimizes the impact of large interferers while providing a given quality of service.

In the second example, the receiver 200 is operating on WCDMA band 1 and the current service is a WCDMA HSDPA service, which has a bit rate of several Mb/s. In general, HSDPA is a best effort packet data service, i.e., the data rate for a user depends on limiting factors, such as cell load, interference, and the like. When signal conditions allow, the HSDPA service reaches very high peak data rates. In order to achieve such high data rates in HSDPA service, the receiver 200 needs to minimize the ICI resulting from digital filtering. Since WCDMA band 1 is used here, only WCDMA carriers are present on adjacent channels, as in the first example above. In addition, due to the best effort service, the digital filter 260 can have an even simpler configuration (i.e., having less taps), or can be omitted, as compared to the digital filter in the first example. The simple digital filter 260 configuration introduces less ICI, which allows the receiver 200 to reach the highest data rates during good signal conditions. There is, however, a tradeoff in terms of sensitivity to adjacent channel interferers. As in the first example, the AGC parameters are selected so the ADC dynamics can be used optimally for representing the desired signal while reducing quantization noise effect.

In the third example, the receiver 200 is operating on WCDMA band 2 (1930-1990 MHz) and the current service is a WCDMA speech service. In the 1900 MHz band, narrow-band communication systems like GSM are also transmitting. Therefore, there is a potential of receiving strong narrow-band interferers close to the desired WCDMA signal. Accordingly, a sharp digital filter 260 is needed having many taps, such as 40-80 taps, in order to remove the strong narrow-band interferer signal. This sharp filtering is preferably only used with speech service in WCDMA band 2 for a couple of reasons. First, the sharper filter consumes significantly more power as compared to the simpler digital filter described in the first and second examples. Second, the sharper digital filter will introduce ICI, which reduces the HSDPA peak performance, since HSDPA service requires very low receiver induced distortions for peak operation. The AGC parameters, such as the reference level settings, are selected so that the ADC dynamic range encompasses the interferer, which is later filtered out by the sharp digital filtering and therefore does not reach the AGC loop. This results in a larger quantization noise level, which also reduces HSDPA peak performance. Thus, this configuration is more suitable for speech service and is less suitable for HSDPA service.

In the fourth example, the receiver 200 is operating on WCDMA band 2 and the current service is a WCDMA HSDPA service. As discussed above, in order to achieve very high peak data rates needed for HSDPA service, the receiver 200 needs to minimize the ICI resulting from digital filtering. Since WCDMA band 2 is used here, however, there is a potential of receiving strong narrow-band interferers close to the desired WCDMA signal. Accordingly, a sharp digital filter 260 is needed having many taps, such as 40-80 taps, in order to remove the strong narrow-band interferer signal. The sharper digital filter, however, will introduce ICI, which reduces the HSDPA peak performance. It is therefore preferable, in this configuration, to only use the sharper filters when needed, i.e., when the strong narrow-band interferer signals are present.

Figure 3:
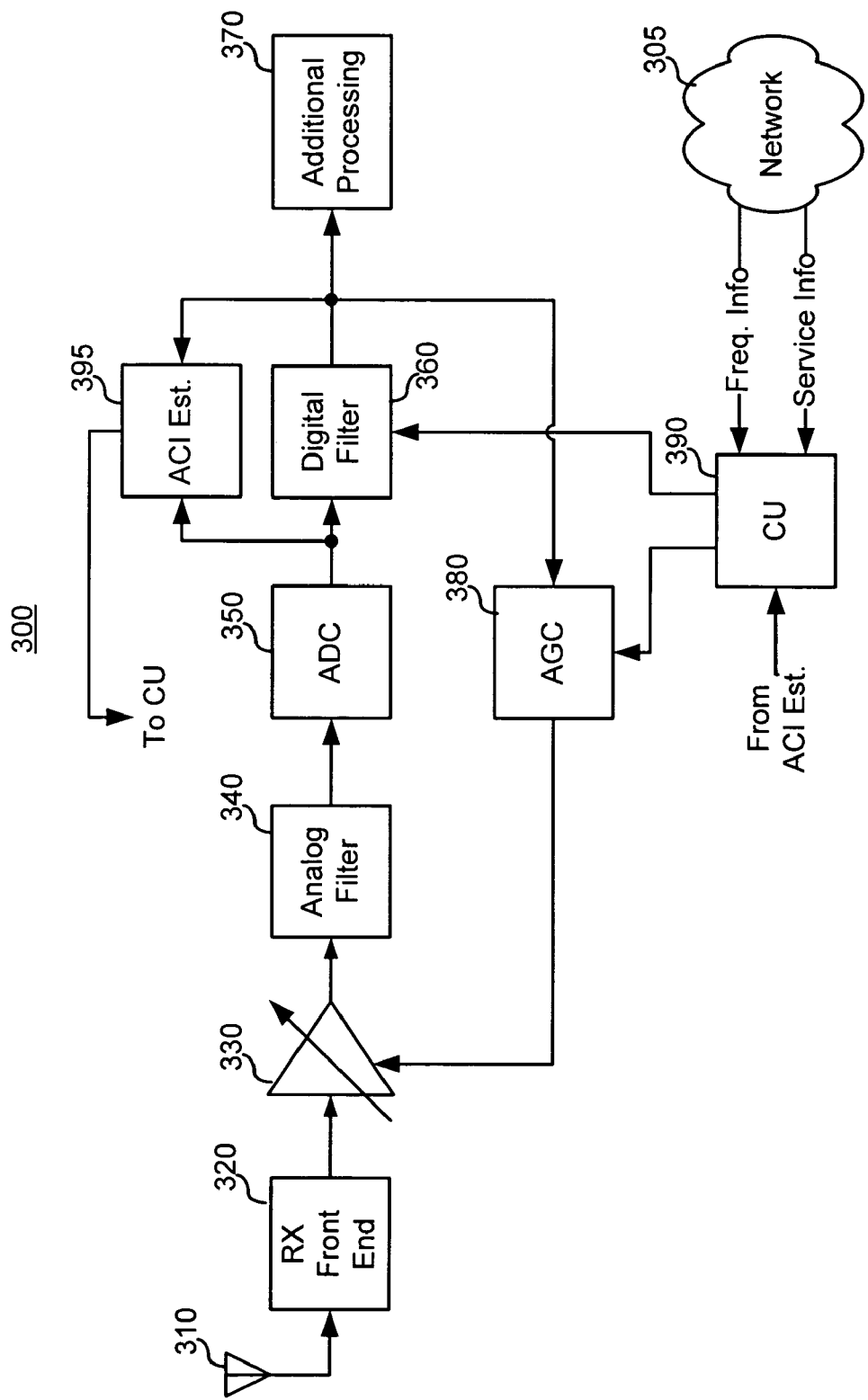
FIG. 3 is a block diagram illustrating a receiver according to an aspect of the invention.

According to another aspect of the invention shown in FIG. 3, an adjacent channel interferer estimator (ACI Est.) 395 is added to a similar receiver arrangement as that described above with reference to FIG. 2. The ACI Est. 395 compares the signal power entering the digital filter 360 to the signal power leaving the digital filter 360 to determine if there are strong narrowband adjacent channel interferers present. The ACI Est. 395 determines that interferers are present if the difference between the input and output signal powers exceeds a predetermined allowable threshold, and otherwise determines that interferers are not present. The ACI Est. 395 then forwards information to the CU 390 regarding the determination of whether the interferers are present. The CU 390 uses this information, together with the information about service and frequency band, to determine a corresponding digital filter 360 configuration, digital filter 360 coefficient settings, and AGC 380 parameter settings to increase receiver performance while minimizing current consumption. Accordingly, in the third and fourth examples (WCDMA band 2) above, where there is a potential for strong narrow-band adjacent channel interferers, their presence can be determined and the more limiting receiver configuration can be used only when needed. That is, during periods when no adjacent channel interferers are present, the AGC and digital filter configuration can be configured as described in the less restrictive first or second examples above.

It will be appreciated by those of ordinary skill in the art that the above four examples are illustrative and many other configurations can be employed in various specific forms without departing from the invention's essential characteristics. For example, the receiver 200, 300 can be operated in WCDMA band 3 (WCDMA 1800) with performance and settings similar to WCDMA band 1.

Figure 4:
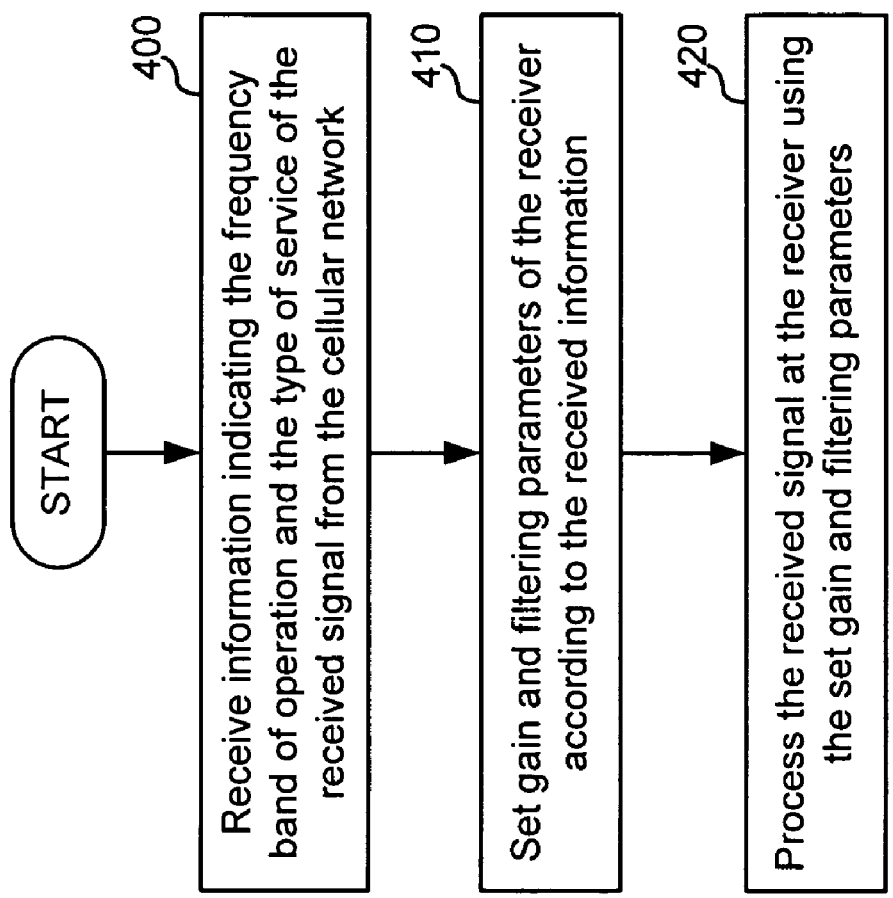
FIG. 4 is a flow chart illustrating a method according to an aspect of the invention.

FIG. 4 is a flow chart illustrating a method according to an aspect of the invention. Information indicating the frequency band of operation and the type of service of the received signal is received from the communication system (400). Gain and filtering parameters of the receiver are set according to the received information (410). The received signal is processed at the receiver using the set gain and filtering parameters (420).

Figure 5:
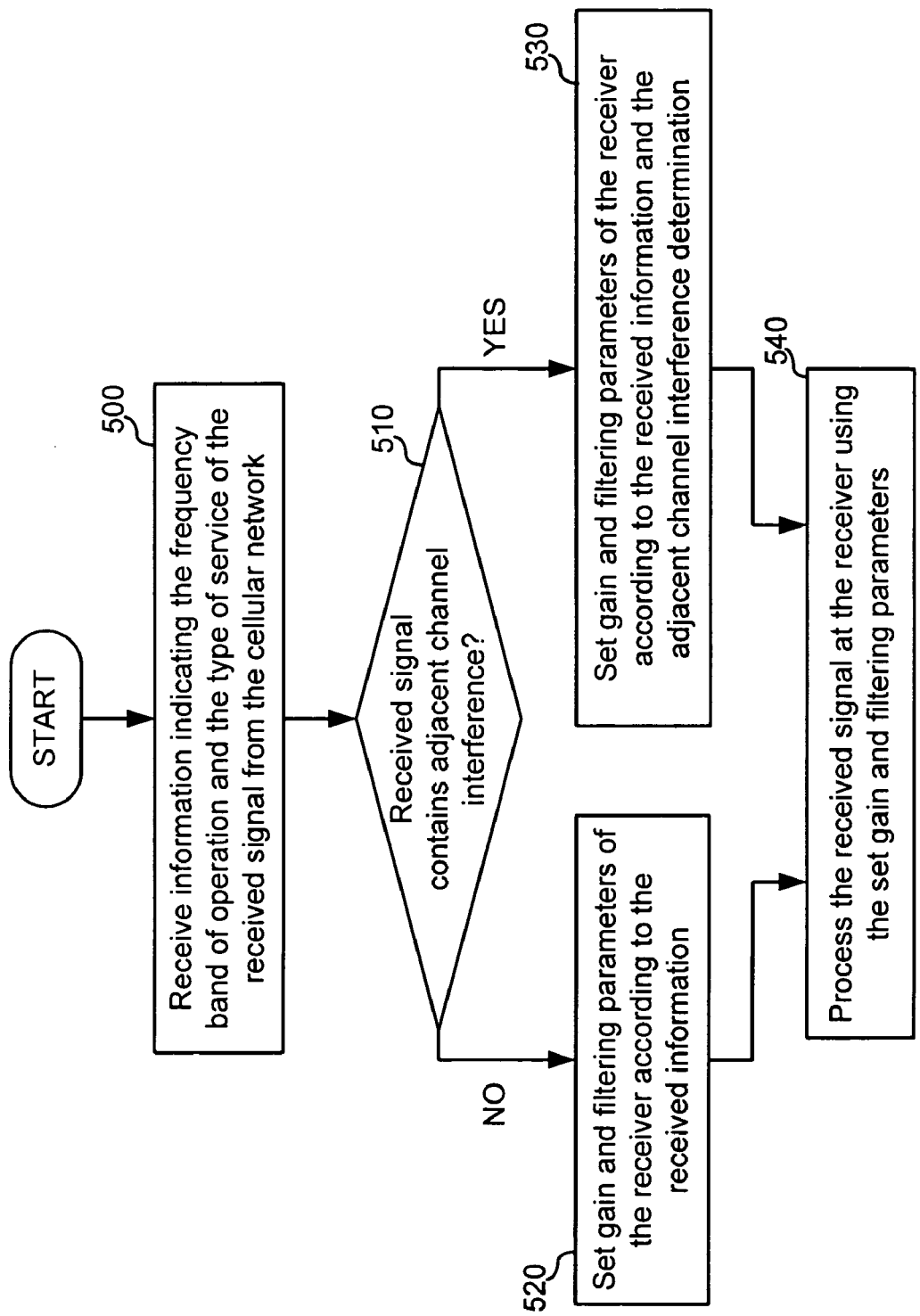
FIG. 5 is a flow chart illustrating a method according to an aspect of the invention.

FIG. 5 is a flow chart illustrating a method according to another aspect of the invention. Information indicating the frequency band of operation and the type of service of the received signal is received from the communication system (500). The ACI Est. 395 determines if the received signal contains adjacent channel interference (510), and if not, gain and filtering parameters of the receiver are set according to the received information (520). If, however, ACI Est. 395 determines that the received signal contains adjacent channel interference (510), gain and filtering parameters of the receiver are set according to the received information and the adjacent channel interference determination (530). The received signal is processed at the receiver using the set gain and filtering parameters (540).

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

It should be emphasized that the terms "comprises", "comprising", "includes", and "including", when used in this description and claims, are taken to specify the presence of stated features, steps, or components, but the use of these terms does not preclude the presence or addition of one or more other features, steps, components, or groups thereof.

What is claimed is:

1. A method for processing a received signal at a receiver in a communication system that operates in accordance with an air interface standard, the receiver including a digital filter and automatic gain control means, the method comprising:
   receiving, at the receiver, information indicating a frequency band of operation and a type of service of the received signal from the communication system, wherein the type of service is one of a number of types of services that are available by means of a same bandwidth via the air interface standard;
   setting gain and filtering parameters of the receiver according to at least the received information indicating the type of service; and
   processing the received signal at the receiver using the set gain and filtering parameters.

2. The method of claim 1, wherein setting the gain and filtering parameters comprises selecting corresponding gain and filtering parameters from a lookup table according to the received information.

3. The method of claim 1, wherein setting the gain and filtering parameters comprises:
   determining whether the received signal contains adjacent channel interference above a predetermined allowable threshold; and
   setting the gain and filtering parameters of the receiver according to the received information and the adjacent channel interference determination.

4. The method of claim 3, wherein determining whether the received signal contains adjacent channel interference comprises:
   determining a difference between an energy level at the input of the digital filter and an energy level at the output of the digital filter; and
   determining that the received signal contains adjacent channel interference when the difference is above the predetermined allowable threshold.

5. The method of claim 1, wherein setting the gain parameters includes setting at least one of a reference value and a plurality of time constants in the automatic gain control means controlling a gain of the receiver.

6. The method of claim 1, wherein setting the filtering parameters includes setting at least one of a finite impulse response and an infinite impulse response in the digital filter for filtering the received signal.

7. The method of claim 1, wherein setting the filtering parameters includes adjusting the number of taps of the digital filter for filtering the received signal.

8. The method of claim 1, wherein the types of services include high speed downlink packet data access (HSDPA), speech service, and video service.

9. The method of claim 1, wherein frequency band of operations include WCDMA band 1, WCDMA band 2, and WCDMA band 3.

10. A receiver for processing a received signal in a communication system that operates in accordance with an air interface standard, the receiver including a digital filter and automatic gain control means, the receiver comprising:
    logic that receives information indicating a frequency band of operation and a type of service of the received signal from the communication system, wherein the type of service is one of a number of types of services that are available by means of a same bandwidth via the air interface standard;
    logic that sets gain and filtering parameters of the receiver according to at least the received information indicating the type of service; and
    logic that processes the received signal at the receiver using the set gain and filtering parameters.

11. The receiver of claim 10, wherein the logic that sets the gain and filtering parameters comprises logic that retrieves corresponding gain and filtering parameters from a lookup table according to the received information.

12. The receiver of claim 10, wherein the logic that sets the gain and filtering parameters comprises logic that:
    determines whether the received signal contains adjacent channel interferers above a predetermined threshold; and
    sets the gain and filtering parameters of the receiver according to the received information and the adjacent channel interferers determination.

13. The receiver of claim 12, wherein the logic that determines whether the received signal contains adjacent channel interference comprises logic that:
    determines a difference between an energy level at the input of the digital filter and an energy level at the output of the digital filter; and
    determines that the received signal contains adjacent channel interference when the difference is above the predetermined allowable threshold.

14. The receiver of claim 10, wherein logic that sets the gain parameters includes logic that sets at least one of a reference value and a plurality of time constants in the automatic gain control means controlling a gain of the receiver.

15. The receiver of claim 10, wherein logic that sets the filtering parameters includes logic that sets at least one of a finite impulse response and an infinite impulse response in the digital filter for filtering the received signal.

16. The receiver of claim 10, wherein the logic that sets the filtering parameters includes logic that adjusts the number of taps of the digital filter for filtering the received signal.

17. The receiver of claim 10, wherein the types of services include high speed downlink packet data access (HSDPA), speech service, and video service.

18. The receiver of claim 10, wherein frequency band of operations include WCDMA band 1, WCDMA band 2, and WCDMA band 3.

19. A control unit for controlling a receiver in processing a received signal in a communication system that operates in accordance with an air interface standard, the receiver including a digital filter and automatic gain control means, the control unit comprising:
  logic that receives information indicating a frequency band of operation and a type of service of the received signal from the communication system, wherein the type of service is one of a number of types of services that are available by means of a same bandwidth via the air interface standard; and
  logic that controls the automatic gain control means and filtering parameters of the digital filter receiver according to at least the received information indicating the type of service to process the received signal at the receiver.

20. The control unit of claim 19, wherein the logic that controls the automatic gain control means and filtering parameters comprises logic that retrieves corresponding gain and filtering parameters from a lookup table according to the received information.

21. The control unit of claim 19, wherein the logic that controls the automatic gain control means and filtering parameters comprises logic that:
  determines whether the received signal contains adjacent channel interferers above a predetermined threshold; and
  sets the gain and filtering parameters of the receiver according to the received information and the adjacent channel interferers determination.

* * * * *